United States Patent
Abdenour et al.

[11] Patent Number: 4,720,061
[45] Date of Patent: * Jan. 19, 1988

[54] AIRCRAFT ROTATING WING SEAL AND METHOD THEREFOR

[75] Inventors: Stephen F. Abdenour, Akron; Stephen M. Polatas, Parma, both of Ohio

[73] Assignee: The B. F. Goodrich Company, Akron, Ohio

[*] Notice: The portion of the term of this patent subsequent to Sep. 1, 2004 has been disclaimed.

[21] Appl. No.: 890,056

[22] Filed: Jul. 28, 1986

[51] Int. Cl.⁴ ............................................. B64C 3/56
[52] U.S. Cl. ................................... 244/46; 244/49; 244/130
[58] Field of Search ............ 244/46, 49, 129.1, 129.4, 244/129.5, 130, 131, 3.27–3.29; 277/167.5, 178, 190; 49/392, 393; 114/282

[56] References Cited

U.S. PATENT DOCUMENTS

| | | | |
|---|---|---|---|
| 555,726 | 3/1896 | Hugo | 49/392 |
| 1,317,960 | 10/1919 | Cobb | 49/392 |
| 1,614,564 | 1/1927 | Lynch | 49/392 |
| 3,155,344 | 11/1964 | Voyt | 244/46 |

*Primary Examiner*—Galen Barefoot
*Attorney, Agent, or Firm*—Woodrow W. Ban

[57] ABSTRACT

A method for sealing a gap between an aircraft fuselage and a wing turntable mounted thereon while in the inflight position. A seal element having wing attached and fuselage attached sections is positioned in the gap and each section is configured to have forward and rearward portions in the direction of rotation of the wing from the inflight to a storage position the forward motion of the fuselage attached section being at least 1% less thick in a direction generally parallel to an axis of rotation of the wing than the rearward portion of the fuselage attached section.

12 Claims, 6 Drawing Figures

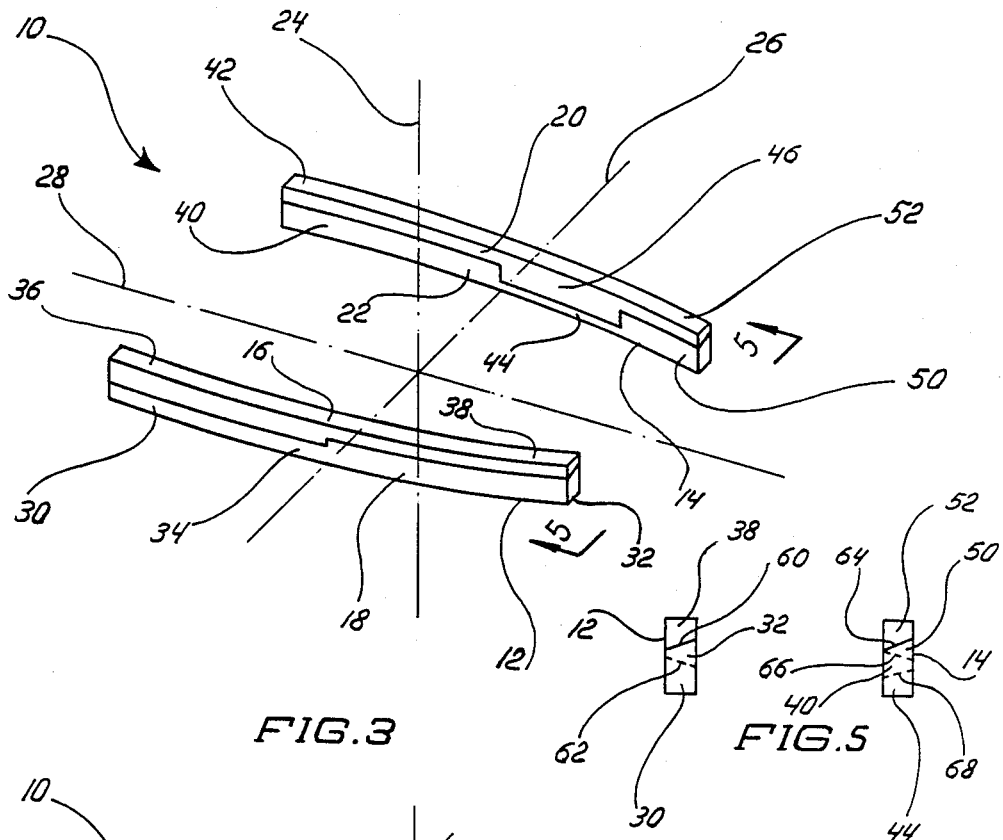
FIG.3
FIG.5
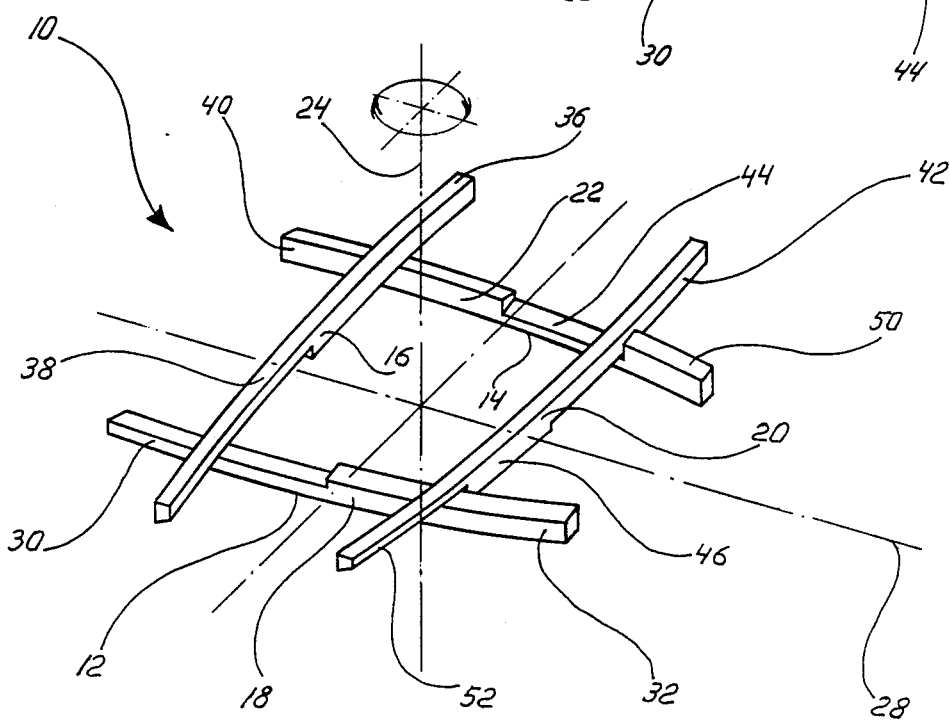
FIG.4

AIRCRAFT ROTATING WING SEAL AND METHOD THEREFOR

RELATED APPLICATION DATA

This application contains subject matter related to subject matter disclosed in U.S. application Ser. No. 890,057, now U.S. Pat. No. 4,690,352, filed on July 28, 1986 and entitled, Aircraft Rotating Wing Seal.

FIELD OF THE INVENTION

This invention relates to seals and methods for sealing for use between surfaces of an aircraft. More particularly, this invention relates to means and methods for sealing between an aircraft wing and an aircraft fuselage component or surface to close a gap that may exist there between by reason of the aircraft wing being rotatable from an inflight position generally perpendicular to a center line of the fuselage to a stowage position wherein the wing generally parallels a center line of the fuselage.

BACKGROUND OF THE INVENTION

Fixed wing aircraft have achieved a large measure of utility in contemporary society. Such aircraft have found utility in tasks ranging from simple acts such as crop dusting, to commercial transportation of goods and persons, to important strategic and military missions. From time to time throughout the development of fixed wing aircraft, it has been necessary for such aircraft to be operated from and stowed within facilities characterized by relatively limited space. An example of such a space limited facility would include an ocean going aircraft carrier capable of conducting flight operations while underweigh.

The problem of how to integrate a large number of fixed wing aircraft into a container such as an aircraft carrier having a relatively modest volume has been a subject of substantial creative endeavor. Because of the exaggerated, cross-like shape of most fixed wing aircraft, their stowage tends to be space inefficient.

One suggestion providing for an increased density of fixed wing aircraft stowage in a limited space has been the fabrication of aircraft wings having an inflection point along the wing to either side of the fuselage at which inflection point the wing may be hinged in an upwardly direction thereby effectively shortening the wing span of the aircraft during storage. Such a solution, however, can produce an aircraft configuration during storage in which the aircraft by reason of the upwardly folded wings is characterized by a substantially elevated height dimension. This increased height dimension can interfere with free movement of the aircraft from one point of stowage to another, particularly in a crowded confine such as an aircraft carrier which may have interfering overhead decks, bulkheads, piping, and the like.

More recently, it has been suggested that a wing may be mounted in a turntable like manner atop an aircraft fuselage. In flight, the centerline of the aircraft wing is fixed approximately perpendicularly to a center line of the aircraft fuselage. During stowage, the wing is rotatable from the inflight position in a particular direction to eventually rest for stowage in a position where the centerline of the wing substantially parallels the centerline of the fuselage. This rotational stowage position effectively provides for a very narrow, very stowable aircraft profile while not contributing substantially to a height requirement necessary to define a "box" capable of containing the length, width and height dimensions of the aircraft being stowed.

With respect to such a "turntable" wing configuration, an opportunity exists for the presence of a gap or space between the wing and surfaces or components of the fuselage immediately adjacent the wing while the wing is positioned for flight. Such a gap, if unsealed, could pose undesirable aerodynamic inefficiencies.

Any seal employed to fill the gap between wing and fuselage components should be substantially resistant to the deleterious effects of extremes of temperature. Such seals typically would encounter frigid temperatures associated with upper atmosphere flying or stationing of the aircraft at geographic locations where temperatures can dip to levels substantially below 0° C.

In addition, depending upon configuration, portions of seals when rotated one across the other as a wing is rotated from an inflight position to a stowage position, can subject opposing members of the rotating seal to substantial compressive forces. These compressive forces can permanently deform or tear such seals, particularly where elastomeric, resulting in potential disfunctional non-sealing at certain points along the seal. Additionally, seals which effect a sealing action by substantial compressive action can with time permanently deform thereby losing seating effectiveness.

A non compression seal for sealing between wing and fuselage of an aircraft having a wing rotatable from an inflight to a stowage position wherein the wing substantially parallels the fuselage and wherein the seal is configured to be relatively free of distortional forces during such rotation, could find substantial application in the construction of aircraft configured for performance in services where rotational wing stowage is desired.

Likewise, a method for sealing between a wing and a fuselage in configurations where the wing is rotatable from an inflight position to a stowage position wherein the longitudinal axis of the wing substantially parallels the longitudinal axis of the fuselage, and wherein the seal is substantially free of compressive strains and stress during such rotation and during sealing, could find substantial utility in the manufacture and operation of such aircraft.

SUMMARY OF THE INVENTION

In an aircraft having a turntable mounted wing configured for rotation in a particular direction about a rotational axis from an inflight position wherein a longitudinal axis of the wing is substantially perpendicular to a longitudinal axis of the fuselage of the aircraft, to a stowage position wherein the longitudinal axis of the wing substantially parallels the longitudinal axis of the fuselage, and wherein a gap thereby exists between components or surfaces of the wing and components or surfaces of the fuselage while the wing is in an inflight position, the present invention provides a method for sealing the gap while the aircraft is in flight. In the method, a seal element is provided and positioned to fill and seal the gap. The seal element is configured to include an upper and a lower section; one of these sections is affixed to the fuselage. The remaining section is affixed to the wing. A point of inflection exists along the seal and each wing attached seal section is configured to have a forward portion with respect thereto having a thickness in a direction generally parallel to the axis of rotation greater by at least 1% than portions rearward in the direction of rotation about the rotational axis from the point of inflection. Conversely, the forward portion of the fuselage attached section is configured to have a thickness in a direction generally parallel to the axis of rotation reduced at least 1% from the corresponding thickness of a rearward portion of the fuselage attached section. The wing attached section is provided to have forward and rearward portions configured in thickness to mate to the fuselage attached section corresponding to mate to the fuselage attached section corresponding forward and rearward portions to produce a seal having a desired thickness in a direction generally parallel to the axis of rotation while the wing is in the inflight position.

It is preferred in the practice of the method of the invention that the forward and rearward portions of the fuselage attached section be beveled along surfaces mating with corresponding beveled forward and rearward portions of the wing attached sections. The rearward portion bevels are configured to be oppositely sloped from the forward portion bevels. In the method of the invention, the beveled surfaces of the forward and rearward portions of the fuselage attached sections and the wing attached sections are brought into aligning contact to establish an effective seal between the wing and fuselage components while the wing is in an inflight position.

The percentage reduction between the thickness in a direction generally parallel to the axis of rotation between the rearward portion and forward portion of the fuselage attached section is configured to be in excess of 1% and most preferably is configured to be in excess of at least 5%.

In a typical application for the method of the instant invention, the aircraft is possessed of wings oriented both to port and starboard of the fuselage defining gaps between both port and starboard fuselage surfaces or components and corresponding wing surfaces or components.

In the practice of the method of the invention, a second seal element is provided with one of the seal elements being configured to seal between a starboard fuselage surface or component and a starboard wing surface or component and the other of the seal elements being provided to seal between a port fuselage surface or component and the port wing seal element is configured to be constructed generally in accordance with the first seal element.

Additionally, it may be desirable that one of the seal elements be possessed of leader portions on both the fuselage attached and the wing sections. These leader portions are positioned in advance of the forward portion of each section in a direction of rotation of the wing fron an inflight to a stowage position about the axis of rotation. For the fuselage attached section, the leader portion typically is configured to be of greater thickness generally parallel to the axis of rotation than the rearward portion of the fuselage attached section of the first seal element. The wing attached section of the first second seal element also is provided with a leader portion configured to mate with and thereby establish a seal in conjunction with the leader portion of the fuselage attached section. This wing attached leader portion is of a thickness generally parallel to the axis of rotation sufficiently thin to enable passage thereof over the rearward portion of the fuselage attached section of the first seal element during rotation of the wing. This thickness determines the thickness of the corresponding leader portion of the fuselage attached section of the second seal element.

In practicing the method of the invention, it is preferably to form the seal element from elastomeric materials. Particularly, it is desirable to select elastomeric materials for forming the seal from a group consisting essentially of silicon rubbers. chlorinated rubbers, nitrile rubbers, natural rubbers, synthetic styrene-butadiene rubbers, acrylonitrile-butadiene-styrene co-polymers, polyolefins, polyvinyls, and polyacrylates.

The above and other features and advantages of the invention will become more apparent when considered in light of a detailed description of the invention together with drawings which follow, together forming a part of the specification.

DESCRIPTION OF THE DRAWINGS

FIG. 3 is a perspective view of a seal made in accordance with the invention.

FIG. 4 is a perspective view of a seal made in accordance with the invention and rotated 90° approximately from the view of FIG. 3.

FIG. 5 is a cross sectional representation along line A—A in FIG. 3.

BEST EMBODIMENT OF THE INVENTION

The present invention provides a method for establishing a seal between a wing and a fuselage in aircraft having a wing mounted in a turntable-like relationship to the fuselage whereby the wing is rotatable from an inflight position generally perpendicular to the fuselage to a stowage position generally parallel to the fuselage.

Figure 1:
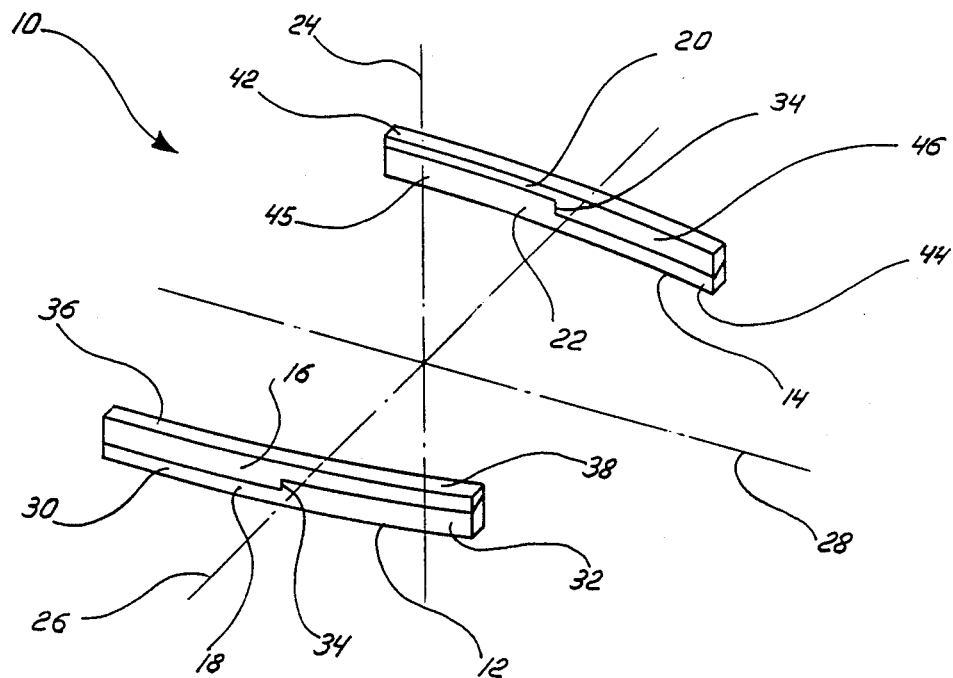
FIG. 1 is a perspective view of a seal made in accordance with the invention.

Referring to the drawings, FIG. 1 is a depiction of a seal 10 made in accordance with the invention. The seal 10 includes first and second seal elements 12, 14, the seal element 12 includes an upper section 16 and a lower section 18. The seal element 14 likewise includes an upper section 20 and a lower section 22.

The seal elements 12, 14, are affixed to an aircraft with the lower sections 18, 22 being affixed to components (not shown in FIG. 1) of an aircraft fuselage, and the upper sections 16, 20, being affixed to wing components (not shown in FIG. 1) of the aircraft. The wing (not shown in FIG. 1) is configured for rotation about an axis 24, hereinafter termed the axis of rotation. It is about the axis of rotation 24 that the wing (not shown in FIG. 1) rotates from a position wherein a wing centerline 26 is positioned generally perpendicular to a fuselage centerline 28 to a position wherein the wing center line 26 generally parallels the fuselage centerline 28. In FIG. 1, th wing centerline 26 is configured to rotate in a clockwise manner about the axis of rotation as viewed from above the aircraft to achieve a relative parallel position with respect to the fuselage centerline 28. When the centerlines 26, 28 are generally parallel, the wing is positioned for stowage; when the wing and fuselage centerlines 26, 28 are generally perpendicular, the wing is configured for flight.

In FIG. 1, the seal element 12 includes a fuselage attached section 18, having a forward portion 30 and a rearward portion 32. The forward and rearward portions 30, 32 are separated by a point of inflection 34. A wing attached section 16 also includes forward and rearward portions 36, 38 respectively. These forward and rearward portions 36, 38 are likewise separated by the point of inflection 34.

The point of inflection 34 is determined to be the point at which motion of the wing centerline 26 associated with the wing (not shown) about the axis of rotation 24 in a direction from an inflight to a stowage position causes motion of the wing attached section 16 rearward portion 38 of the seal element 12 in a direction away from the fuselage centerline 28 while the forward portion 36 of the wing attached section 16 is directed in a motion generally toward the fuselage centerline 28. This point of inflection 34 is stationery with respect to motion towards or away from the fuselage centerline 28 at the instantaneous moment of commencement of rotation of the wing centerline 26 from the inflight position to the stowage position.

The portion 30 of the lower section 18 is configured to be less thick in a direction generally parallel to the axis of rotation 24 than the rearward portion 32. This difference in thickness provides that as the wing centerline rotates to a stowage position, the wing attached rearward portion 38, of the wing attached section 16 of the seal element 12 passes across the fuselage attached section 18, forward portion 30 of the seal element 12 whereby no contact is engenderd between the portion 38 and the portion 30. Thus, after break away of the seal sections 16, 18, no seal deformation occurs and no resistance to rotation associated with seal section to seal section contact characterizes the rotation of the wing. This lack of contact avoids damage to the seal 12 element during rotation, and facilitates movement of the wing by decreasing resistance associated with wing rotation motion. The seal portions 36, 38 mate with the seal portions 30, 32.

The seal element 14 likewise has a fuselage foward fuselage attached portion 44 and a wing forward attached portion 46 together with a fuselage attached rearward portion 40 and a wing attached rearward portion 42. In the seal element 14, the direction of rotation dictates that the portion 46 be configured to be relatively thick in a direction generally parallel to the axis of rotation 24 leaving the fuselage attached portion 44 thinner in a direction generally parallel to the axis of rotation than the rearward portion 40.

Figure 2:
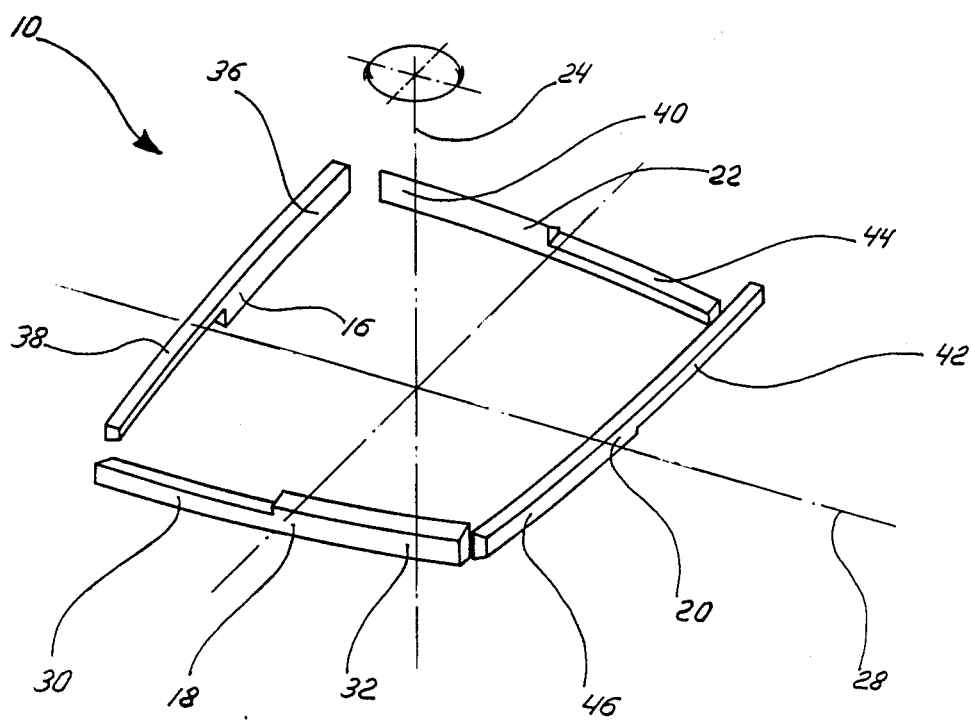
FIG. 2 is a perspective view of a seal made in accordance with the invention and rotated 90° from the view of FIG. 1.

Referring to FIG. 2, the seal of FIG. 1 is shown rotated 90° to a position wherein the longitudinal centerline of the fuselage 28 and the longitudinal centerline of the wing 26 are generally parallel. The differing thicknesses between the forward portions 30, 44 of the fuselage attached sections 18, 22 permit the rearward portions 38, 42 of the wing attached seal sections 16, 20 to pass over the forward portions 30, 44 without substantial interference.

Referring to the drawings, FIG. 3 is a representation in substantial conformity with the representation of FIG. 1, that is of a seal for use in a turntable mounted aircraft wing. In FIG. 3, elements having like fit and function to the FIG. 1 depiction bear like reference numbers. So, therefore, in FIG. 3 a pair of seal elements 12 14, are provided having fuselage attached sections 18, 22 and wing attached sections 16, 20. Upper portions 36, 38, 42, 46 and lower portions 30, 32, 40, 44 are provided which function as in FIG. 1.

A distance between the axis of rotation 24 and the seal element 12 in FIG. 3 is exceeded by a length of the seal element from the point of inflection 34 to one or the other ends of the seal element 12. Where such relative distances obtain, as the seal element rotates from the inflight position wherein the longitudinal axis of the wing 26 is generally perpendicular to a longitudinal axis of the fuselage 28 to a position as shown in FIG. 4, the wing mounted forward portion 36 would protrude beyond and collide with the fuselage mounted rearward portion 40 of the seal element 22. Leader portions 52, 50 therefore are provided on the seal element 14. The leader portion 52 is configured typically by being made thinner in a direction generally parallel to the longitudinal axis 24 than the rearward portion 38 of the wing attached section 16 of the seal element 12 to permit the portion 52 to override the portion 32 upon rotation of the seal. Likewise, the leader portion 50 of the fuselage attached section 22 of the seal element 14 is configured, typically by being made thicker in a direction generally parallel to the longitudinal axis of rotation 24, then a corresponding rearward portion 32 of the fuselage attached section 18 of the seal element 12 to permit the override.

The leader portion 52 thereby overrides the rearward portion 32 as the seal elements 12, 14 are rotated by motion of the wing (not shown) from an inflight position wherein a longitudinal axis of the wing 26 generally is perpendicular to a longitudinal axis 28 of the fuselage to a position wherein the longitudinal axes 26, 28 are generally parallel. The portion 36 is configured with respect to the portion 42 so that the portion 36 can pass over the portion 40 upon rotation.

Again, the portions 52, 36 override the portions 32, 40 respectfully without substantial interference during rotation of the seal elements 12, 14. Accordingly, resistance to the motion of the wing is reduced and seal life enhanced by a lack of sliding and compressive forces on the seal elements during rotation.

Referring to FIG. 5, the seal elements 12, 14, are shown in cross section. The portion 38 is possessed of a bevel 60; the portion 30 is possessed of a bevel 62. The bevels 60, 62 are oppositely sloped.

In a seal element 14, the portion 52 includes a bevel surface 64; the portion 50 mates to the portion 52 along the bevel 64. The portion 44 includes a bevel 68 while the portion 40 includes a bevel 66. The bevels 64, 66, 68 are oppositely sloped one from the next.

As may be seen from FIGS. 4 and 5 considered together, when the seals 12, 14 rotate, the bevels are oriented in a direction so that the portions separate along the beveled mating surfaces and move away from the beveled mating surfaces in performing rotation.

Figure 6:
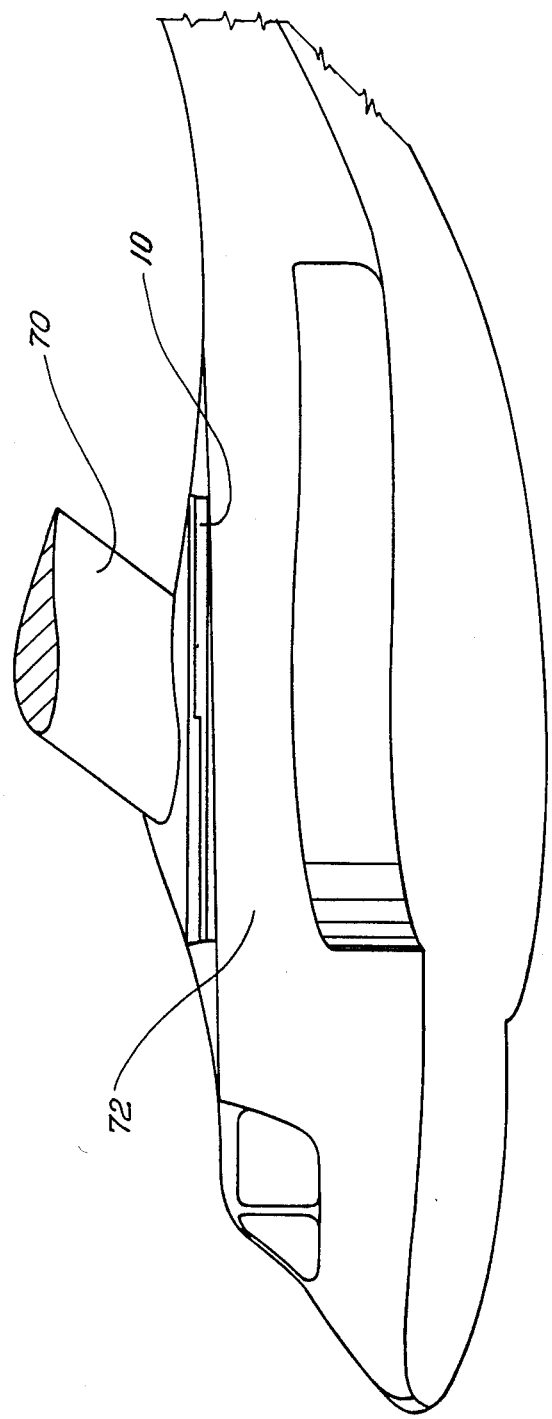
FIG. 6 is a representation of a seal installed aboard an aircraft.

Referring to the drawings, FIG. 6 is a depiction of the seal of the invention employed aboard an aircraft including the wing 70 rotatable upon a fuselage 72 from an inflight position to a stowage position. The seal fills and seals a gap between the fuselage or component thereof and the wing, or component thereof.

The seal elements 12, 14 are formed of an elastomer. By elastomer what is meant is a material, which upon deformation, from an original position, displays a significant tendency to return to its original shape. Elastomers suitable for use in the practice of the instant invention include silicon rubbers, chlorinated silicon rubbers, chlorinated rubbers, nitrile rubbers, natural rubbers, synthetic styrene-butadiene rubbers, acrylonitrile-butadiene-styrene co-polymers, polyolefins, polyvinyls and polyacrylates. Particularly preferred are synthetic and natural rubbers. Other suitable or conventional materials having generally elastomeric characteristics are believed useable in the practice of the invention. The portions 30, 44 and of the seal elements 12, 14 are reduced in thickness in a direction generally parallel to the axis of rotation from the portions 40, 32 by at least one percent (1%). Preferably this percentage exceeds 1% and most preferably exceeds 5%. This reduction in thickness permits the seal portions 38, 42 to pass over the fuselage attached portions 30, 44 respectively without substantial interference or contact.

In the method of the invention, the seal element 10 is applied to fill the gap between a turntable mounted rotatable wing of an aircraft and the fuselage of the aircraft. Particularly, the seal is applied to fill gaps between surfaces or components of the aircraft fuselage and aircraft wing. The seal elements 12, 14 are positioned within the gaps. The seal elements 12, 14 each include two sections 16, 18, 20, 22. As an example, one section 16 is attached or mounted to a surface or component of the fuselage of the aircraft and the other section 18 to a surface or component of the wing. Typically, the wing mounted section 16 is rotatable with the wing while the fuselage mounted section 18 remains fixed during rotation of the wing from the inflight position to the stowage position. The seal elements 12, 14 includes at least four (4) portions, two on each section 16, 18, 20, 22. The stationary or fuselage mounted section 18 is provided to include a forward portion 30 and a rearward portion 32. The stationary section forward portion 30 is provided to be reduced in thickness in a direction generally parallel to an axis of rotation of the wing from the inflight to the stowage position from the corresponding rearward portion 32. The reduction in thickness with respect to the rearward portion 32 of the seal section is at least 1 percent, and more preferably greater than 1% and most preferably greater than 5%. The moveable or wing mounted section 16 includes forward 36 and rearward 38 portions configured to mate with the forward 30 and rearward 32 portions of the stationary section and thereby establish a seal of uniform thickness. A point of inflection 34 is identified along the seal element and the point of inflection establishes a division between the forward 30, 36 and rearward 32, 36 portions of the sections of the element. The sections 20, 22 are configured in a manner similar to the sections 16, 18.

In preferred embodiments the portions are provided to be beveled and to mate along the bevel. The bevel are provided to be oppositely oriented as between the forward 30, 36 and rearward 32, 38 portions of each section to facilitate movement of the wing attached section 16 which rotates with respect to the fixed or fuselage attached section 18 section from the inflight position to the stowage position and return. The portions of the moveable 16 and non-moveable 18 sections meet along the bevels.

Typically, a pair of the elements 12, 14 are provided, configured similarly, to fill between gaps on the port and starboard sides of the aircraft between the port wing and port fuselage and starboard wing and starboard fuselage respectively.

One the seal elements 12, 14 is provided to have a pair of leader portions 50, 52, one associated with each of the wing and fuselage attached sections. The leader portions 50, 52 are configured whereby the fuselage mounted section leader portion is of a desired thickness in a direction generally parallel to the axis of rotation whereby the wing mounted section leader portion 52 is capable of passing over without deleterious contact with the rearward portion 32 of the first seal element 12 in the rearward portion of the other seal element fixed section.

While a preferred embodiment of the invention has been shown and described in detail, it should be apparent that various modifications may be made thereto without departing from the scope of the claims that follows.

What is claimed is:

1. In an aircraft having a turntable mounted wing configured for rotation in a particular direction about a rotational axis from an inflight position wherein a longitudinal axis of the wing is substantially perpendicular to a longitudinal axis of a fuselage of the aircraft, to a stowage position where the longitudinal axis of the wing substantially parallels the longitudinal axis of the fuselage, and wherein a gap thereby exists between the wing and the fuselage while the wing is in an inflight position, the gap requiring sealing, a method of sealing the gap comprising the steps of: (a) providing a seal element; (b) positioning the seal element to fill and seal the gap; (c) configuring the seal element to include a pair of sections; (d) affixing one of the sections to the fuselage, and affixing the remaining section to the wing; (e) identifying a point of inflection along the seal; (f) configuring each seal element to having a thickness in a direction generally parallel to the rotational axis; (g) configuring a portion of the fuselage attached section forward of the point of inflection in a direction of motion from the inflight to stowage positions to have a thickness generally parallel to the rotational axis reduced by at least 1% from a corresponding thickness of the portion of the fuselage attached section rearward of the inflection point; (h) providing the corresponding wing attached section to have corresponding forward and rearward portions configured in thickness to mate to the forward and rearward portion of fuselage attached section to yield a seal having a desired thickness in a direction generally parallel to the rotational axis while the wing is in the inflight position.

2. In the method of claim 1, the additional steps of (a) beveling the forward and rearward portions of the fuselage attached section along surfaces mating with the corresponding forward and rearward portions of the wing attached section with the rearward portion bevel of each section being oppositely sloped from the forward portion bevel, the wing attached sections being beveled in a configuration to mate in a sealing relationship with the forward and rearward portions of the fuselage attached sections to establish an effective seal between the wing and fuselage component while the wing is in an inflight position.

3. The method of claim 1, the percentage being at least 5%.

4. The method of claim 2, the reduction percentage being at least 5%.

5. In the method of any one of claims 1–3 or 4, the additional steps of providing a second seal element configured in accordance with the first seal element, one of the seal elements being positioned to seal between a port aircraft wing and a port fuselage compound and the remaining seal being positioned to seal between a starboard aircraft wing and a starboard fuselage component.

6. In the method of claim 5, the additional steps of providing the fuselage attached section of the second seal element to have a pair of leader portions, and positioning the leader portion in advance, in the direction of rotation, of the forward portions of the second seal element fuselage attached section; providing the leader portions to have a desired thickness in a direction generally parallel to the axis of rotation whereby the leader portion of the wing attached section passes over without significant interference the rearward portion of the fuselage attached section of the first seal element during rotation of the wing to the stowage position; and providing the leader portions cooperating to define a seal having a desired thickness in a direction parallel to the axis of rotation.

7. In the method of any one of claims 1–3 or 4, forming the elements from a material selected from a group of elastomers consisting essentially of: silicon rubbers, chlorinated rubbers, nitrile rubbers, natural rubbers, synthetic styrene-butadiene rubbers, acrylonitrile-butadiene-styrene copolymers, polyolefins, polyvinyls, and polyacrylates and mixtures thereof.

8. In the method of claim 6, forming the elements from a material selected from a group of elastomers consisting essentially of; silicon rubbers, chlorinated rubbers, nitrile rubbers, natural rubbers, synthetic styrene-butadinene rubbers, acrylonitrile-butadiene-styrene copolymers, polyolefins, polyvinyls, and polyacrylates and mixtures thereof.

9. In an aircraft having a turntable mounted wing configured for rotation in a particular direction about an axis fron an inflight position wherein a longitudinal axis of the wing is substantially perpendicular to a longitudinal axis of a fuselage of the aircraft, to a stowage position wherein a longitudinal axis of the wing substantially parallels a longitudinal axis of the fuselage, and wherein at least one gap exists between each of port and starboard wing and fuselage components while the wing is in the inflight position, the gaps requiring sealing, a method for sealing the gap comprising the steps of: (a) providing a pair of seal elements; (b) positioning one seal element to seal the gap between the fuselage and the port wing component of the aircraft; (c) positioning the second seal element to seal between the fuselage and the starboard wing component; (d) providing the seal elements to each include a pair of sections; (e) affixing one of the sections of each seal element to a component of the fuselage; (f) affixing the remaining section of each seal element to a component of the wing; (g) identifying a point of influction for each seal element; (h) configuring the fuselage attached sections each to have forward and rearward portions in as to a direction of rotation of the wing from an inflight position to a stowage position separated at the point of inflection; (i) providing each fuselage attached section forward portion with a thickness generally parallel to the axis of rotation of the wing reduced by at least one percent (1%) from a corresponding thickness of the fuselage attached section rearward portion of the same section of the same seal element; and (j) configuring the wing attached section of each seal element to have corresponding forward and rearward portions configured to mate with and to the fuselage attached section portions to produce a seal having a desired thickness in a direction generally parallel to the axis of rotation.

10. In the method of claim 9, the step of beveling the portions of the fuselage attached sections on surfaces where mating is accomplished to the other section portions, with the rearward portion being beveled oppositely sloped from beveling applied to the forward portion, and beveling the other section portions in a configuration to mate with the fuselage attached section portions to seal between wing and fuselage sections with the wing in an inflight position.

11. In the method of claim 10, the additional steps of: providing one of the wing and fuselage attached section of one of the seal elements with leader portions; positioning the leader portions in advance in the direction of rotation of the forward portions of the seal element; providing the leader portions with a desired thickness in a direction parallel to the axis of rotation whereby the wing attached leader portion passes over without substantial contact the rearward portion of the fuselage attached section of the other seal element during rotation of the wing to the stowage position and whereby the leader portions to define a seal having a desired thickness in a direction of rotation generally parallel to the axis of rotation.

12. In the method of any one of claims 9–10 or 11, the steps of forming the elements from materials selected from a group of elastomers consisting of: silicon rubbers, chlorinated rubbers, nitrile rubbers, natural rubbers, synthetic styrene-butadiene rubbers, acrylonitrile-butadiene-styrene copolymers, polyolefins, polyvinyls, and polyacrylates and mixtures thereof.

* * * * *

UNITED STATES PATENT AND TRADEMARK OFFICE
CERTIFICATE OF CORRECTION

PATENT NO. : 4,720,061
DATED : January 19, 1988
INVENTOR(S) : Stephen F. Abdenour and Stephen M. Polatas It is certified that error appears in the above-identified patent and that said Letters Patent are hereby corrected as shown below:

| | |
|---|---|
| Column 3, Lines 9-10 | delete second occurrence "to mate to the fuselage attached section corresponding" |
| Column 4, Line 58 | delete "th" insert --the-- |
| Column 7, Line 48 | delete "bevel" insert --bevels-- |
| Column 8, Line 16 | delete "where" insert --wherein--. |

Signed and Sealed this

Second Day of August, 1988

*Attest:*

DONALD J. QUIGG

*Attesting Officer*    *Commissioner of Patents and Trademarks*